United States Patent [19]
Whited

[11] 3,977,716
[45] Aug. 31, 1976

[54] WIND DRAG REDUCER FOR TOWED VEHICLES

[76] Inventor: Dexter M. Whited, R.D. 1, Box 106, Chicora, Pa. 16025

[22] Filed: Nov. 25, 1974

[21] Appl. No.: 526,508

[52] U.S. Cl................................. 296/1 S; 105/2 R; 296/91
[51] Int. Cl.² ........................................ B62D 35/00
[58] Field of Search.................... 296/1 S, 91, 95 R; 180/1 FV; 105/2 R

[56] References Cited
UNITED STATES PATENTS

| | | | |
|---|---|---|---|
| 3,425,740 | 2/1969 | Vaughan.............................. | 296/1 S |
| 3,711,146 | 1/1973 | Madzar et al........................ | 296/1 S |
| 3,797,879 | 3/1974 | Edwards.............................. | 296/1 S |
| 3,815,948 | 6/1974 | Alford................................. | 296/1 S |
| 3,866,967 | 2/1975 | Landry et al. ..................... | 296/91 X |

Primary Examiner—Robert J. Spar
Assistant Examiner—Donald W. Underwood
Attorney, Agent, or Firm—Carothers and Carothers

[57] ABSTRACT

A wind drag reducer for trailers or cargo carrying bodies wherein the front upper portion of the trailer or body is exposed above the cab of the motor vehicle connected to pull the same. The drag reducer consists of two substantially flat and vertical side panel means which are each respectively attached at one end to the front or sides of the trailer adjacent the front side edges thereof and converge therefrom to a vertical line midway between the front sides of the trailer where they are connected together over top of the cab of the tractor or motor vehicle to thereby form a V-shaped structure which splits the wind and reduces the resultant drag on the sides of the trailer.

5 Claims, 7 Drawing Figures

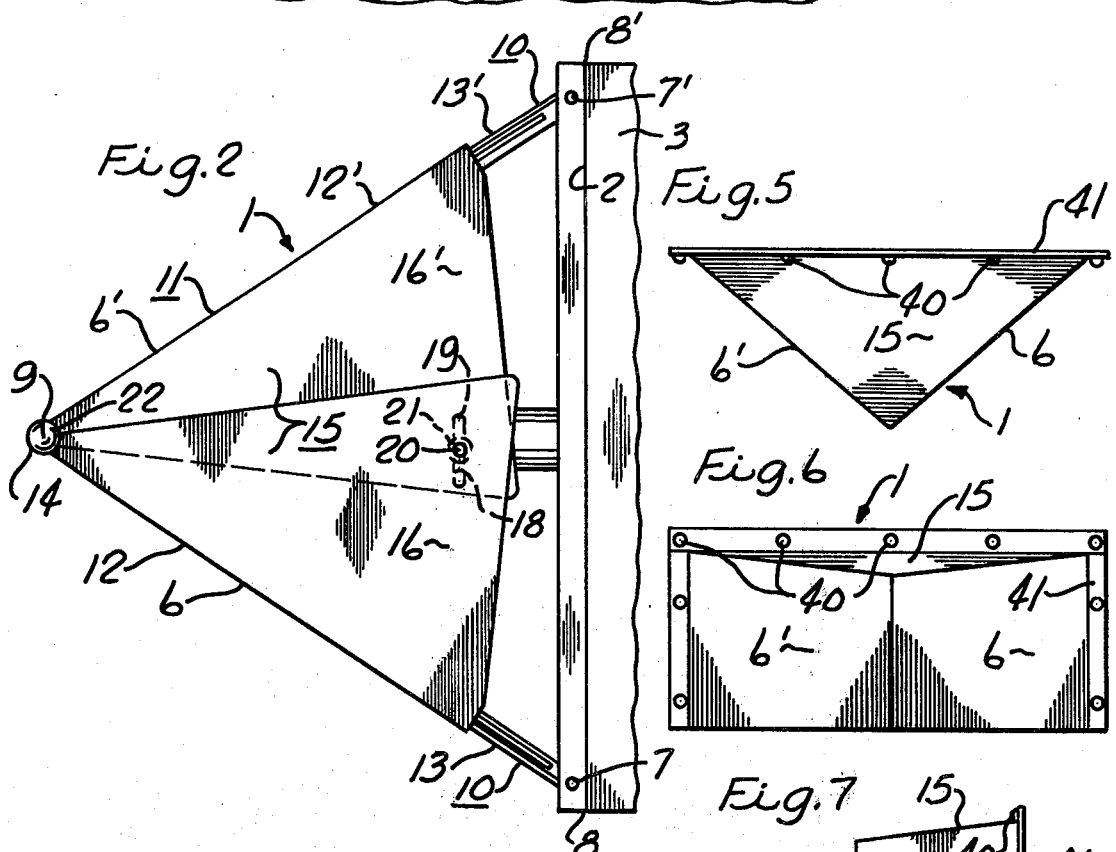

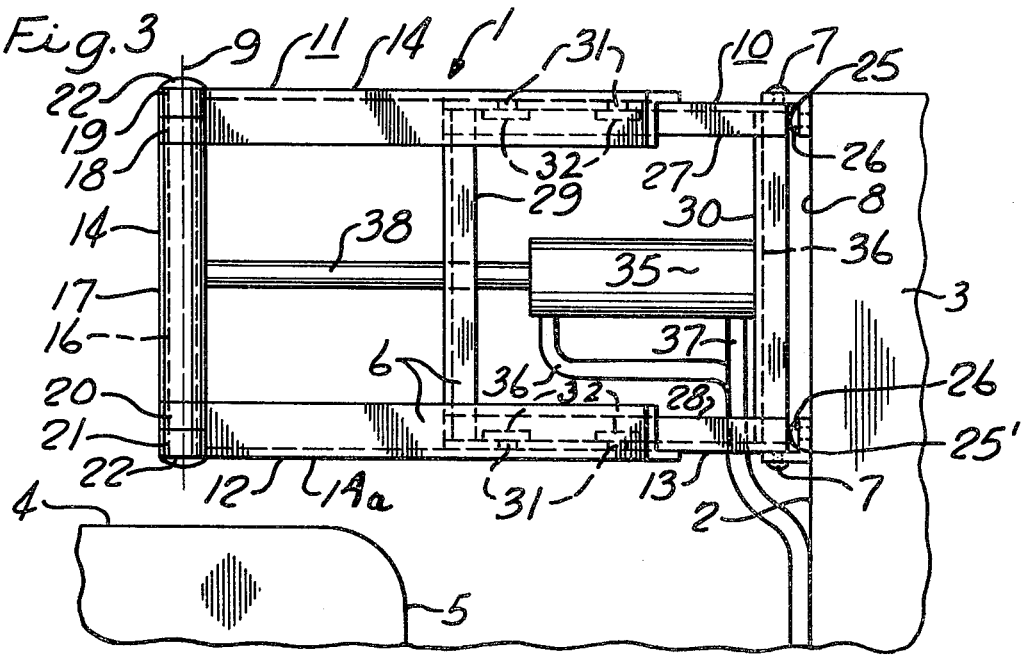
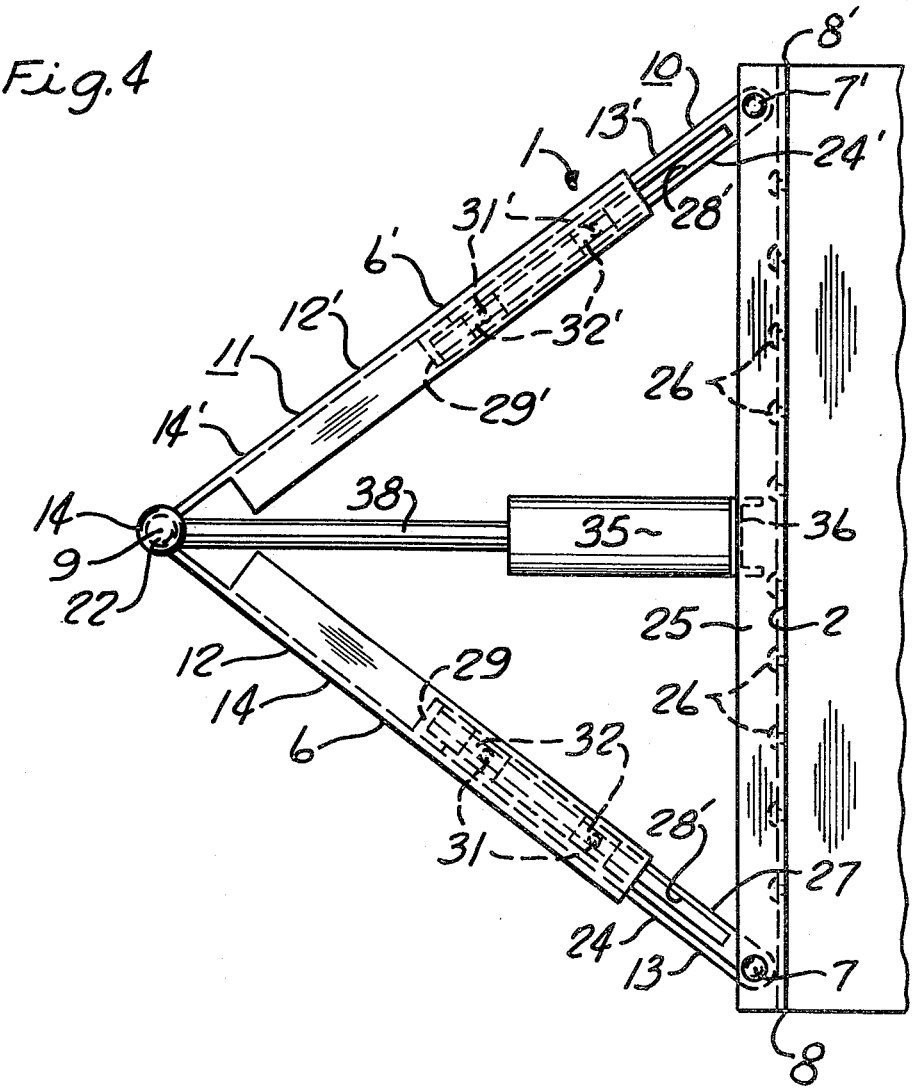

WIND DRAG REDUCER FOR TOWED VEHICLES

BACKGROUND OF THE INVENTION

1. Field of the Invention

This invention relates to apparatus for reducing the wind resistance or drag effecting the movement of vehicles through a fluid, and more particularly to drag reduction in cargo carrying vehicles such as single chassis trucks, tractor trailers and cars with trailers in tow wherein the trailer or cargo body extends above the cab or roof of the truck or car.

2. Discussion of the Prior Art

The box-like structures which are utilized to carry cargo unfortunately create high drag or wind resistance when being pulled along the highways. In an attempt to reduce this drag, many patents have been granted for apparatus which are designed to reduce the air resistance. For example, the following U.S. Patents illustrate tractor trailer or automobile and trailer combinations wherein a wind deflector of one type or another is placed on top of the cab of the tractor or the roof of the automobile in order to reduce the drag produced by the wind engaging the flat upper front portion of the trailer or cargo body which is exposed above the top or roof of the cab or automobile.

| U.S. Pat. No. | 2,863,695 | Stamm |
| U.S. Pat. No. | 3,241,876 | Saunders |
| U.S. Pat. No. | 3,309,131 | Saunders |
| U.S. Pat. No. | 3,348,873 | Saunders |
| U.S. Pat. No. | 3,596,974 | Adams |

However, in each of these disclosures, the wind deflector in the first instance is not as high as the top of the trailer and secondly, there is a large space or gap provided between the wind deflector and the front of the trailer. This causes a great amount of turbulence between the wind deflector and the trailer front or cargo body front, on unitary chassis trucks, (hereinafter also commonly referred to as a trailer), and accordingly, the wind drag resistance is not materially reduced. In addition, such a wind deflector does not tend to stabilize the trailer when it is traveling at higher speeds.

U.S. Pat. No. 3,697,120 issued to Saunders, illustrates a drag reducer which is attached directly to the front of the trailer. This structure tends to stabilize the trailer, however, it does not materially reduce the drag resistance as major flat front portions of the trailer are still exposed directly to the high speed winds. In addition, a large gap still exists between the front of the trailer and the back of the cab such that the wind is permitted to flow down into this gap with a great amount of turbulence thereby increasing the drag and reducing stability.

Another patent of interest is U.S. Pat. No. 2,914,231 issued to W. L. Hornke for a luggage carrier which utilizes a V-shaped front for deflecting the wind. However, the Hornke structure, while assisting in drag resistance to a luggage rack, does not truly split the wind for stabilization purposes, and in addition does not teach how such principles might be applied to tractor trailers, automobiles with tractors in tow and single chassis trucks.

SUMMARY OF THE INVENTION

The present invention comprises in combination, a motor vehicle-trailer combination with a wind drag reducer for trailers which are exposed above the roof of the motor vehicle connected to pull the trailer. The wind drag reducer comprises two substantially flat and vertical side panel means which are each respectively attached at one end to the trailer adjacent the front side edges thereof and converge forward to a line midway between the front side edges where they are connected together over top of the cab or roof of the motor vehicle, thereby forming V-shaped structure which splits the wind and carries the wind thus split all the way out to the extreme front side edges of the trailer thereby reducing the wind drag on the sides of the trailer. In addition, the apparatus prevents the wind which is split from entering into the gap or space between the motor vehicle and the trailer, thereby reducing extra drag which might be caused by air turbulence therebetween.

The V-shaped wind drag reducer is preferably also provided with a top panel covering at least a portion of the gap or space formed between the top edges of the side panel means. The wind which is thus split over top of the roof or cab of the motor vehicle before it has a chance to enter the gap or space between it and the trailer, and is deflected away from the sides of the trailer and the top covering assists in insuring that unwanted turbulence which can increase drag is not induced between the side panels of the wind drag reducer.

In its simplest form, the apparatus may be unitarily molded of a plastic or fabricated of metal such as aluminum or steel.

It is important that the forward V-portion of the apparatus extend over the roof or cab of the motor vehicle towing or leading the trailer and accordingly, the apparatus in one embodiment is preferably constructed such that it is forwardly extendable over and retractable from over the tractor cab or vehicle roof in order to compensate for the many different types of tractors, automobiles and hitching arrangements used to connect the tractor or automobile to the trailer, as many different automobiles or tractors may tow the same type trailer, and thus the gap or space existing between the back of the tractor cab and the front of the trailer or the back of the vehicle and the front of the trailer may differ greatly from one vehicle to the next.

In the extendable version of the apparatus, the two side panel means each consist of two parallel overlapping panel members interengaged with each other to slide forwardly and rearwardly relative to each other to extend and retract the forward portion or nose of the apparatus. The panel means are hinged relative to each other at the front converging connection over top of the roof or cab of the motor vehicle and also at their respective points of attachment to the trailer to permit necessary compensation when the apparatus is extended or retracted.

In addition, a drive means such as a pneumatic motor or a hand operated screw may be provided to operate the extendable wind drag reducer.

It is preferable in the extendable embodiment of the apparatus that two top panels be provided which overlie each other and a portion of the otherwise open space or top formed between the side panel means, with each top panel respectively secured to the top of one of the two fowardmost panel members which are hinged together and which form the nose. In this manner, at least a portion of the V-shaped opening defined by the top edges of the side panel means and the top front edge of the trailer is covered to help prevent the entrance of an air flow down into the gap between the motor vehicle and the trailer front through the top of the drag reducer thereby preventing excessive turbulence which can increase the drag.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

FIG. 1 is a view in side elevation with portions removed of one embodiment of the wind drag reducer of the present invention as shown in combination with a tractor trailer.

FIG. 2 is a top view of the apparatus illustrated in FIG. 1.

FIG. 3 is a view in side elevation of the structure shown in FIG. 1 with the side panels and top panels of the wind drag reducer removed to disclose the structure thereunder.

FIG. 4 is a top view of the same structure illustrated in FIG. 2 with the top panels and side panels of the wind drag reducer removed to reveal the structure thereunder.

FIG. 5 is a plan view of a unitary wind drag reducer of the present invention molded of one piece of plastic.

FIG. 6 is a view in front elevation of the wind drag reducer illustrated in FIG. 5.

FIG. 7 is a view in side elevation of the wind drag reducer illustrated in FIG. 5.

DETAILED DESCRIPTION OF THE DRAWINGS

Referring to FIGS. 1 and 2, the wind splitter or wind drag reducer or resistance apparatus 1 is secured to the upper front face 2 of the trailer 3 and projects forwardly therefrom out over the top 4 of the cab 5 of the tractor.

The wind drag reducer 1 consists basically of two vertical side panel means 6 and 6' which are attached at one end to the trailer as indicated at 7 and 7' respectively, adjacent the front side edges 8 and 8' of the trailer.

These panels 6 and 6' converge forwardly to a line midway between the front side edges 8 and 8' as indicated at 9.

The wind drag reducer 1 disclosed in FIGS. 1 and 2 is an extensible apparatus wherein the distance between line 9 and the front 2 of the trailer 3 may be varied to accommodate for different types of tractors which have different spacings between the rear of cab 5 and the trailer front 2 when attached to a trailer.

Accordingly, the wind drag reducer 1 is basically constructed of a rear or base portion 10 which is secured to the front 2 of the trailer 3 and a forward section 11 which telescopes over top of the rear or base section 10 and is extendable outwardly from the front 2 of trailer 3 so that the connection 9 may be positioned as desired over top of the cab 5.

It can be noted particularly from FIG. 2 that as the outer or forward extendable portion 11 is moved either toward or away from the front face 2 of the trailer, the overall triangular configuration changes as the angle between each panel means 6 and 6' and the front 2 of the trailer varies as also does the angle directly formed between the panels 6 and 6' where they converge at 9, and in addition the length of the panel means 6 and 6', between their respective connections 7 and 7' to the trailer and the line 9 of intersection, must vary.

To accommodate for these variations, the vertical side panel means 6 and 6' are respectively constructed actually of two separate panel members 12 and 13 and 12' and 13'. The forward panels 12 and 12' respectively overlap the rear panel members 13 and 13' and they are also slidably interengaged with each other so that the overall length of the panel means 6 and 6' may be varied.

In addition, to compensate for the aforesaid changes in angle, the rear panel members 13 and 13' are hinged to the trailer as indicated at 7 and 7' and the forward connection between panel members 12 and 12' is also hinged by means of hinge connection 14 about axis or line 9.

Accordingly, when the forward section 11 of the apparatus 1 is shoved forward away from the front face 2 of the trailer, the panel members 12 and 12' will converge making the angle therebetween smaller as permitted by hinge 14, and at the same time, hinges 7 and 7' will permit rear panel members 13 and 13' to increase their angles respectively with respect to the front face 2 of the trailer.

It is also preferable that as much of the top of the apparatus 1 be covered as possible, and in FIG. 1, it can be seen that a top panel 15 is provided which actually consists of two separate panel members 16 and 16' which are rigidly connected to the top of side panel members 12 and 12' respectively, and which overlap each other in the middle of the apparatus 1 as indicated.

Thus, when the forward extendable section 11 is moved and the panel means 6 and 6' therefore change their angles relative to the face 2 of the trailer, the panel members 16 and 16' will be permitted to slide over each other as required to change the total top exposed area of the top panel 15.

For support, the two panel members 16 and 16' are tied together as indicated at 18 by means of a slot 19 through the underlying panel member 16' and the pin 20 which is rigidly secured to the upper or overlying panel member 16 and extends with sufficient play through the slot or opening 19 and is terminated with the stop 21 to thereby hold the panel members 16 and 16' together while still permitting them to slide over each other as required when the apparatus 1 is extended or retracted. The internal workings of the extendable drag resistance apparatus 1 will become more apparent by reference to FIGS. 3 and 4.

Referring to FIGS. 3 and 4, the framework of the extended portion or nose 11 consists of upper arms 14 and 14' respectively and mating arms 15 which underlie arms 14 and 14'.

Each of these arms is constructed of angle iron or any other suitable metal angle such as aluminum.

The upper set of arms 14 and 14', as well as the lower set, are each hinged relative to each other by means of hinge 14. Hinge 14 consists of a central shaft 16, the main sleeve body 17 which is coaxially received over shaft 16, collar 18 which is also coaxially received over shaft 16 and which is rigidly connected to arm 14, and collar 19 which overlies collar 18 and is also coaxially received over shaft 16 and is rigidly secured to arm 14'.

In a similar manner, collar 20 at the bottom of hinge 14 is coaxially received on shaft 16 and is rigidly secured to arm 14a and collar 21 is rigidly secured to the bottom mating arm of arm 14a (not shown) in a manner similar to that described in conjunction with arm 14' and collar 19.

The ends 22 of shaft 16 are peened in order to retain the hinge member 14 together.

The rear section of portion 10 of the apparatus 1 consists of two square frame structures 24 and 24' which are each respectively hinged at 7 ad 7' to top and bottom angle irons 25 and 25'. Angles 25 and 25' are, in turn, rigidly secured in parallel to the front 2 of the trailer by means of screws 26.

Frames 24 and 24' consist of horizontal angle members 27 and 28 which are vertically tied together with vertical angle 29 and the rearward flat member 30 to form the square structure of frames 24 and 24'.

The four arms of section 11 each slide over top of a respective arm of the rear section 10 as illustrated. In order to firmly support the front section 11, slots 28' are provided in each of the horizontal arms of the rear section 10 through which pins 31 extend. The pins 31 are each rigidly secured to a respective arm of the extendable section 11, and pass through their respective slots 28' and are terminated with stops 32 which slide against the inside surfaces of each of the upper and lower arms of the rear section 10. Accordingly the entire extendable section 11 may be moved forwardly or rearwardly such that the forward section 11 slides in telescopic fashion over top of the rearward frame or portion 10 of the apparatus 1.

Pneumatic motor 35 is secured at its rearward end to the middle of channel 36 which runs vertically between angle members 25 and 25' and is welded thereto.

Pneumatic motor 35 consists of an air cylinder and piston, the latter of which is caused to move forward or rearwardly by means of air introduced under pressure into one side of the cylinder or the other via air supply hoses at 36 and 37 which may be connected to the conventional air brake system of the vehicle for operation.

When pneumatic motor 35 is operated, piston rod 38, which is rigidly secured at its foward end to the hinge body 17, may be extended or retracted from within the cylinder of pneumatic motor 35 to thereby extend or retract the forward section or nose 11 of the apparatus.

FIGS. 5, 6 and 7 illustrate the simplest form of the apparatus of the present invention. Here, the wind drag resistance apparatus 1 is unitarily molded of plastic and is secured to the uppermost face of a trailer by means of screws 40 which pass through openings in the perimeter 41. Again, the nose will project out over top of the truck cab.

The embodiment of FIGS. 5, 6 and 7 is generally used with single chassis trucks where the space between the tractor cab and the trailer does not vary as with tractor trailers. In an actual test with an embodiment of this type, a gasoline fuel savings of 27.4% was realized.

I claim:

1. In combination, a motor vehicle trailer combination with a wind drag reducer for trailers which are exposed above the roof of the motor vehicle connected to pull the same, comprising two vertical side panel means each respectively hinged at one end to the trailer adjacent the front side edges thereof and converging forward to a vertical line midway between said front side edges where they are vertically hinged together overtop of the roof of the motor vehicle connected to pull said trailer, said two side panel means each consisting of two parallel overlapping panel members interengaged to slide forwardly and rearwardly relative to each other to extend and retract said wind resistance apparatus, drive means anchored between the front of said trailer and said forward hinge connection to extend or retract said apparatus.

2. The combination of claim 1 wherein said drive means is a pneumatic cylinder and piston motor.

3. In combination, a motor vehicle trailer combination with a wind drag reducer for trailers which are exposed above the roof of the motor vehicle connected to pull the same, comprising two vertical side panel means each respectively hinged at one end to the trailer adjacent the front side edges thereof and converging forward to a vertical line midway between said front side edges where they are vertically hinged together overtop of the roof of the motor vehicle connected to pull said trailer, said two side panel means each consisting of two parallel overlapping panel members interengaged to slide forwardly and rearwardly relative to each other to extend and retract said wind resistance apparatus, two top panels overlying each other and a portion of the space formed between said side panel means with each respectively secured to the top of one of the two forward panel members which are hinged together.

4. In combination, a motor vehicle trailer combination with a wind drag reducer for trailers which are exposed above the roof of the motor vehicle connected to pull the same, comprising two vertical side panel means each respectively hinged at one end to the trailer adjacent the front side edges thereof and converging forward to a vertical line midway between said front side edges where they are vertically hinged together overtop of the roof of the motor vehicle connected to pull said trailer, said two side panel means each consisting of two parallel overlapping panel members interengaged to slide forwardly and rearwardly relative to each other to extend and retract said wind resistance apparatus.

5. The combination of claim 4 characterized by a top panel covering at least a portion of the top V-shaped gap formed between said side panel means.

* * * * *